United States Patent [19]
Estrada

[11] 4,169,394
[45] Oct. 2, 1979

[54] ANTI-DIFFERENTIAL DEVICE
[75] Inventor: Jose L. Estrada, Long Beach, Calif.
[73] Assignee: Phalanx Corporation, Long Beach, Calif.
[21] Appl. No.: 832,072
[22] Filed: Sep. 12, 1977
[51] Int. Cl.² ............................................. F16H 1/40
[52] U.S. Cl. ........................................ 74/713; 74/711
[58] Field of Search .................................. 74/711, 713

[56] References Cited
U.S. PATENT DOCUMENTS

| | | | |
|---|---|---|---|
| 1,324,861 | 12/1919 | Taylor | 74/711 |
| 1,481,889 | 1/1924 | Carhart | 74/711 |
| 3,930,424 | 1/1976 | Myers, Sr. | 74/711 |

FOREIGN PATENT DOCUMENTS 954721  4/1964  United Kingdom ...................... 74/711

Primary Examiner—Samuel Scott
Assistant Examiner—Wesley S. Ratliff, Jr.
Attorney, Agent, or Firm—Louis J. Bachand

[57] ABSTRACT

An anti-differential device for a differential mechanism comprising a constricting guide surface circularly disposed about the side gear hub of the differential mechanism and a constrictable guide follower laterally displaceable by the side gear in side-thrusting response to loading of its axle, to simultaneously radially engage the differential casing and the side gear hub in mutually binding relation, against their relative rotation.

7 Claims, 8 Drawing Figures

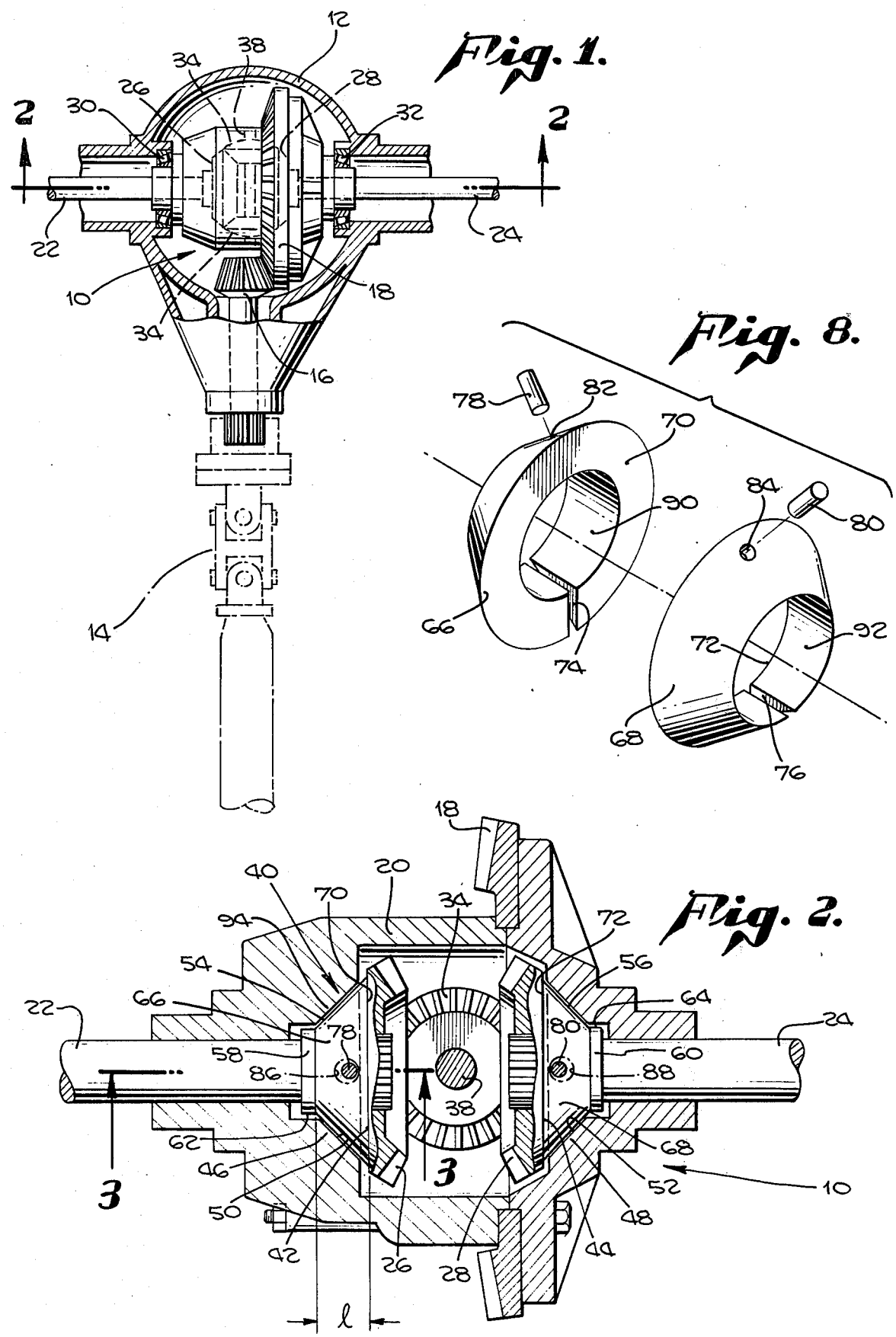

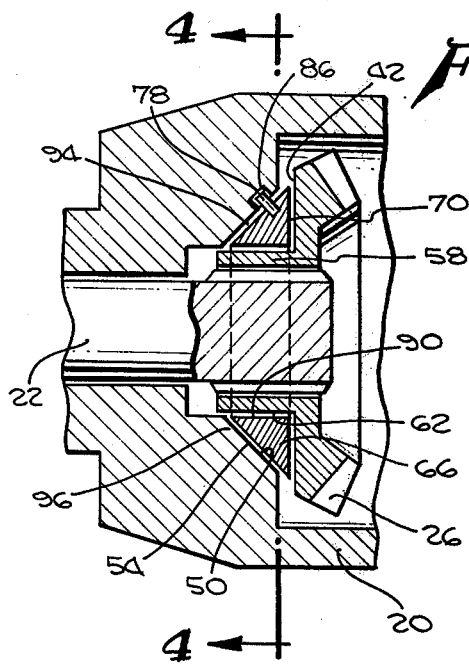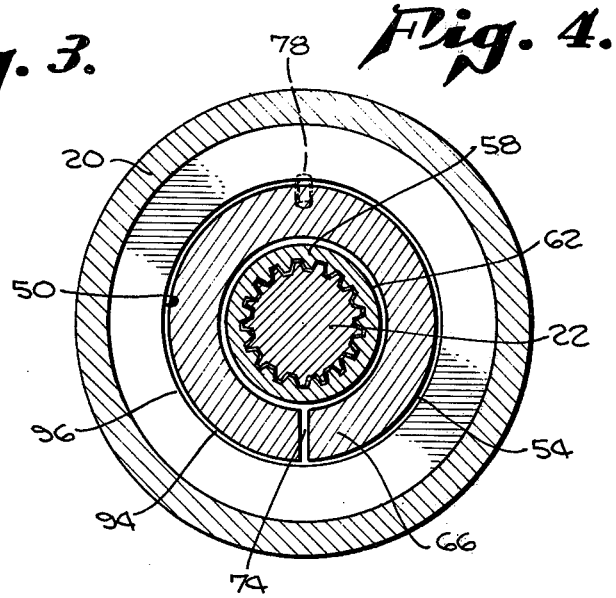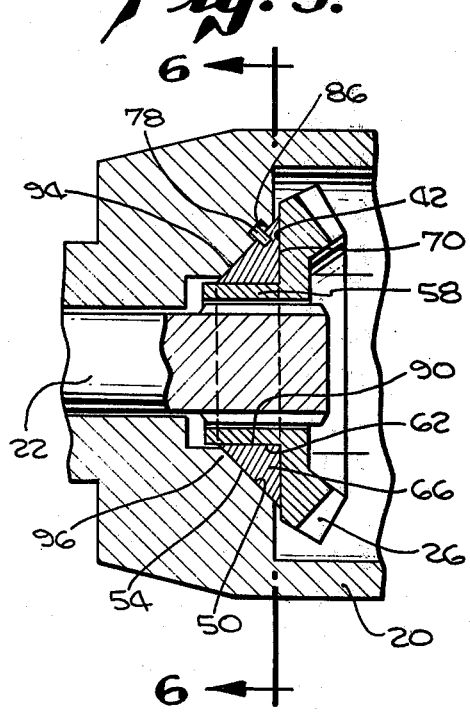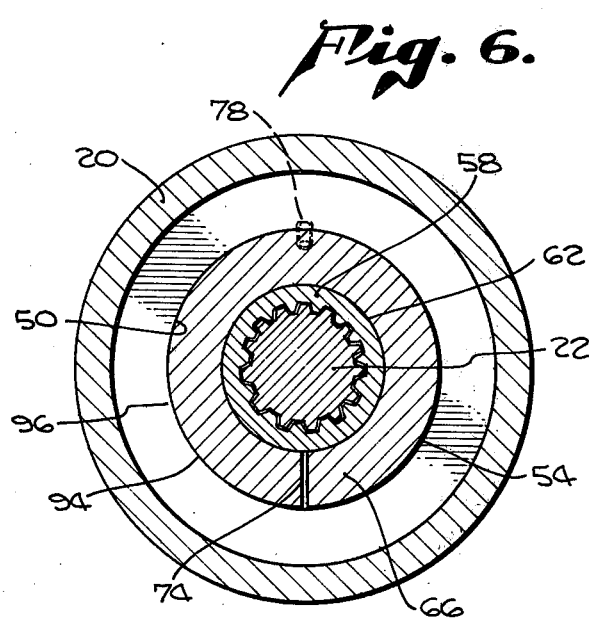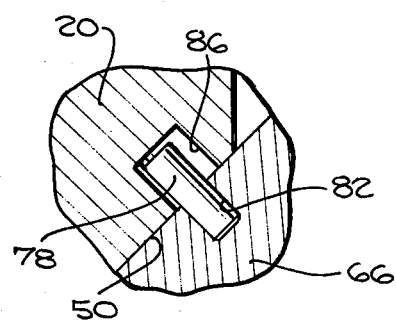

ANTI-DIFFERENTIAL DEVICE

BACKGROUND OF THE INVENTION

This invention has to do with automotive differentials of the type having a rotatable casing and a differential mechanism therein. More particularly, the invention is concerned with an anti-differential structure for use in a conventional automotive differential arrangement.

Automotive differentials are gear arrangements used to enable relatively different speeds of rotation by automotive axles and their wheels so that wheels driven by a common propeller shaft may travel different distances, as when a vehicle is turning a corner. Differentials for automobiles and like devices are well known as such.

It is in the nature of automotive differentials to respond to different rates of rotation of the vehicle wheels by a rolling accommodation which tends to distribute power differentially between the two wheels according to available traction.

It has long been recognized that this attribute of differential mechanisms is disadvantageous in certain circumstances. Most automobiles today can be obtained with anti-differential devices which serve to arrest or block the normal differential action for particular purposes. For example, when a vehicle has one wheel on a low traction surface such as ice or mud, an anti-differential mechanism will act to transmit power (which the differential normally would put at the less tractive wheel) toward both wheels, whereby the vehicle is able to remove itself from an icy or muddy area.

In automobile racing, the vehicles are not intended for street use, but anti-differential mechanisms are desirably provided for such vehicles in order that the action of the differential will deliver the tremendous power passed through the drive train to both wheels and not merely to the wheel having less traction, in this way improving racing performance.

Typical anti-differential devices available today use the phenomenon of the side gears (which are the gears coupled to the drive axles) moving laterally outward due to the involute pressure angle between the differential pinions and their side gears, to compress a friction material between the side gear axial faces and the wall surrounding the differential mechanism, that wall typically and hereinafter referred to as a casing. A differential casing is typically provided with opposed openings through which drive axles are passed and a third and possibly fourth opening through which shafts are inserted for the purpose of mounting the differential pinions. If rotation between the side gears and the differential casing is blocked, the differential action of the differential mechanism is likewise blocked and an anti-differential effect is obtained. The anti-differential effect alters the normal differential response and delivers power towards the axle which is driving its wheel in ice or mud, or in a drag racing situation, the right rear wheel which is otherwise sometimes lifted into the air so as to totally lose traction, and redistributes that power to both wheels including the wheel which has good traction.

As noted, the use of friction devices between the side gears and the casing has been proposed and adapted in many instances to obtain an anti-differential effect. Known friction discs have not always proven satisfactory in heavy duty anti-differential situations, particularly drag racing. The binding effect obtained between the casing and the side gear, particularly in repetitive applications, and moreover the release characteristics of known anti-differential structures, have been found wanting, in that such structures can hang up and load the drive train unnecessarily, as well as diminish the driver's control of his vehicle. These latter effects are highly dangerous in various racing situations.

SUMMARY OF THE INVENTION

It is accordingly an object of the present invention to provide an anti-differential structure which ameliorates the problems of previously known anti-differential structures. It is a further object to provide an anti-differential structure of improved design which is quick-acting, quick-releasing, self-compensating for wear, simple to construct, and highly reliable and durable in use. It is a further object of the invention to provide a novel arrangement of parts, including a ring of self-reducing diameter responsive to unwanted differential action to block relative rotation between side gears and their casing. These and other objects of the invention are realized in an automotive differential comprising a rotatable casing and a differential mechanism therein which includes side gears having axle coupling hubs, by provision therein of nonslip structure blocking relative rotation between an unloaded axle and the casing, the structure comprising for each axle a constricting guide surface circularly disposed about the side gear hub and a constrictable guide follower laterally displaceable by the side gear in side-thrusting response to loading of its axle, to simultaneously radially engage the casing and the side gear hub in mutually binding relation. In particular embodiments of the invention, the guide surface is defined by the casing, the guide follower comprises a split ring, means are provided for keying the guide follower and the guide surface against relative rotation therebetween, and the side gear hubs extend outward beyond the plane of the side gear.

In particularly preferred embodiment, the guide surface and guide follower are relatively outwardly tapered, the guide follower comprising a radially split frusto-conical ring having a cylindrical bore and an annular base portion, the ring split defining the ring constrictability, the ring guide follower base portion and the side gear hub typically being coaxial, the casing defining opposed axle-passing openings, the openings inwardly forming the guide surfaces circularly about the guide rings. This embodiment as well includes means keying the guide ring to the guide surface against relative rotation therebetween, the keying means typically comprising a pin element, and a slot element parallel to the displacement direction of the guide ring.

In a highly preferred embodiment, the invention provides in an automotive differential comprising a rotatable casing and a differential mechanism therein including opposed side gears having outwardly axially projecting hubs adapted to splined engagement with respective axles, a nonslip structure blocking relative rotation between an axle in the loaded condition and the casing, the structure comprising about each axle a coaxial outwardly tapered frusto-conical guide surface formed by the casing extending about the side gear hub to define therewith a frusto-conical annulus, and within the annulus a congruent frusto-conical guide ring split along an axial plane to be constrictable between first and second diametrical proportions, the ring in each proportion being congruent with the guide surface, the ring being keyed to the casing guide surface in supporting relation, normally axially opposed to the side gear and circumferentially spaced from the side gear hub in the first diametrical proportion, the ring being responsive to side gear axial face engagement to slide outward in constricting relation along the guide surface taper to its second, reduced diametrical proportion, thereby to mutually bind the side gear hub and the casing against their relative rotation.

BRIEF DESCRIPTION OF THE DRAWINGS

The invention will be further described as to an illustrative embodiment in conjunction with the attached drawings, in which:

FIG. 1 is a plan view, partly broken away and in section, of an automotive differential mechanism having and anti-differential structure in accordance with the present invention;

FIG. 2 is a view taken on line 2—2 in FIG. 1 and greatly enlarged;

FIG. 3 is a view taken on line 3—3 in FIG. 2;

FIG. 4 is a view taken on line 4—4 in FIG. 3;

FIG. 5 is a view like FIG. 3, showing the anti-differential structure in blocking engagement;

FIG. 6 is a view like FIG. 4 taken on line 6—6 in FIG. 5;

FIG. 7 is a detail view of the pin and slot keying arrangement between the guide ring and the guide surface; and FIG. 8 is a perspective view of opposed locking rings in their use orientation, the differential parts having been removed for clarity.

DESCRIPTION OF THE PREFERRED EMBODIMENTS

With reference now to the drawings in detail, in FIGS. 1 and 2, differential mechanism 10 is located in axle housing 12 and is coupled to propeller shaft and linkage 14 through drive pinion 16, engaged with ring gear assembly and ring gear 18 rotates differential casing 20 within the housing 12. Left and right (as viewed) drive axles 22, 24 are coupled to wheels (not shown) at their outboard end and to left and right side gears 26, 28 respectively supported in the housing 12 by roller bearings 30, 32.

Side gears 26, 28 are splined to their respective axles 22, 24 (e.g. see FIG. 4) for driving engagement therewith. A plurality of differential pinion gears 34 journaled on cross-shafts 36, 38 roll in toothed engagement with the teeth of the side gears 26, 28, as the casing 20 is rotated by the ring gear assembly 18. Thus the side gears 26, 28 are coupled to each other and to the propeller shaft and linkage 14 through the differential pinion gears 34 enabling relatively different rates of rotation of axles 22, 24.

Thus far described, the differential mechanism 10 is generally conventional. A nonslip or anti-differential structure according to the invention is shown at 40. Initially the interior conformation of the casing is different from the conventional. Rather than flat shoulders opposing the axial face 42, 44 of the side gears 26, 28, the present casing 20 is outwardly tapered uniformly about the axle passing openings 46, 48, defining a frusto-conical guide surface 50, 52 thereby which is concentric with and outboard of the side gears opposite thereto, to define a frusto-conical space or annulus 54, 56 between each side gear and its guide surface opposite. Each side gear 26, 28 hub portion 58, 60, is extended outward relatively to provide a cylindrical shoulder 62,64 of a predetermined diameter as will be described.

As a signal feature of the invention, there is provided for cooperation with the guide surfaces 50, 52 just mentioned, a guide follower in the form of a laterally displaceable split rings 66, 68 again of frusto-conical exterior configuration as shown and provided with cylindrical bases 70, 72 of a dimension to receive side gear hub portions 58, 60 for free rotation.

Split rings 66, 68 formed of steel, bronze or other metal, e.g. having a hardness of 30 to 60Rc are provided with a kerf 74, 76 in a radial plane to provide the split, the "angular" width of the kerf being critical to the operation of the present anti-differential structure as will now be explained.

With particular reference to FIGS. 3-8, the split rings 66, 68 are secured against rotation relative to the casing 20 by pins 78, 80 which fit snugly in bores 82, 84 in the rings and will have a loose fit in slots 86, 88 formed in the guide surfaces 50, 52 whereby the rings are free for limited axial movement relative to the casing guide surfaces.

The axial travel distance for each ring 66, 68 relative to the guide surfaces 50, 52 is determined by the tapering dimensions of the ring and the taper of the guide surfaces. In general, the axial length "1" of the ring is selected to be such that the ring base portion 70, 72 will engage the side gear axial face 42, 44 before the ring is fully seated in the cone of guide surface 50, 52. In this manner an axial as well as radial engagement (to be described) is realized, enhancing the effectiveness of the differential action. Generally the pin 78 and slot 86 do not limit relative axial movement.

An axial movement of the rings 66, 68 into their respective cavities defined by guide surfaces 50, 52 results from lateral displacement caused by the lateral movement of the side gears, which as a result of the involute pressure angle between side gear and pinion gear characteristically accompanies differential pinion driving of the side gear upon loading of the side gear axle. Thus the transmission of power to the axle through the side gear causes the side gear to move laterally outward responsive to the loaded condition of the wheel and axle. This side gear movement causes the side gears axially to impinge on the ring 66, 68 inducing their lateral displacement, and axially of guide surfaces 50, 52.

OPERATION

As will be readily appreciated from a comparative consideration of FIGS. 3 and 5 together with FIGS. 4 and 6, under normal, differential action conditions (FIGS. 3 and 4) the split ring 66 has a first diametrical proportion, resulting from the kerf 74 being fully open such that the side gear hub 58 circumscribed by the ring bore 90 rotates freely relative to the ring and thus the casing which is keyed to the ring by pin 80 riding in slot 86. As the side gear 26 moves laterally outward along its splined engagement with axle 22 under the side thrusting action of differential pinion 34 as the axle is loaded, the ring base portion 70 engages the axial face 42 of the side gear 26 and the ring 66 itself is also displaced laterally. The slot 86 is dimensioned to permit the corresponding displacement of the pin 80. The sloped shoulder 94 of the split ring 66 begins to engage guide surface 50 defined by the congruently formed sloped shoulder 96 of the casing annular cavity 54. A sliding engagement results as the ring shoulder 94 moves relative to the casing shoulder 96. The casing shoulder thus acts as a guide surface and the split ring as a guide follower, the increasing relative axial displacement of the ring and casing and the cavity 54 taper wedging the ring more and more tightly into the cavity.

The result can be seen in FIGS. 5 and 6. Not only is the split ring shoulder 94 wedged tightly against the cavity shoulder 96 and the ring base portion 70 firmly engaging the axial face 42 of the side gear 26, but the kerf 74 has been closed, effecting a constricted, second, reduced diametrical proportion, limited by the kerf closure, the kerf however is so proportioned that the ring bore 90 closes on the side gear hub i.e. is constricted upon the hub, in friction engagement. The result of the simultaneous conical, axial and cylindrical engagements of the split ring is a blockage of relative movement between the casing 20, the ring 66 and the side gear 26 and thus the axle 22 splined to the side gear, and thus a blockage of differential action.

Upon cessation of the side-thrusting movement of side gear 26, force against the ring 66 is relieved. At this axial point a further signal advantage of the present anti-differential device over those known heretofore, particularly friction discs, is manifested. The ring 66 resiliently reassumes its first or natural diameter when the axial force thereon is released. The force of ring engagement is reduced to nominal levels. The conical engagement with casing shoulder 96 fosters reverse axial movement (rightward in FIG. 3). Expansion of ring 66 frees hub 58 from the cylindrical grip of ring bore 90. Differential action is rapidly resumed. The thus realized quick release feature is automatic and responsive to normal unloading of the formerly loaded axle; it does not require complicated release mechanisms.

I claim:

1. In an automotive axle differential comprising a rotatable casing and a differential mechanism therein, including axle coupled side gears, non-slip structure blocking relative rotation between an unloaded axle and said casing, said structure comprising for each axle a constricting guide surface circularly disposed about said axle radial and a split ring, frusto conical, constrictable guide follower having cylindrical bore and an annular base portion coaxial with said axle said follower being laterally displaceable by said side gear in side-thrusting response to loading of said axle to simultaneously radially mutually bind said casing and said axle.

2. Nonslip differential according to claim 1 in which said guide surface is defined by the casing.

3. Nonslip differential according to claim 1 including also cooperating pin and slot means keying said guide follower and guide surface against relative rotation therebetween.

4. Nonslip differential according to claim 1 including also side gear hubs coupling said side gears to said axle, each said hub extending outward beyond the plane of its side gear.

5. Nonslip differential according to claim 1 in which said guide surface and said guide follower are relatively outwardly tapered.

6. Nonslip differential according to claim 1 in which said casing defines opposed axle-passing openings, said openings inwardly forming said guide surfaces circularly about said guide rings.

7. In an automotive differential comprising a rotatable casing and a differential mechanism therein, including opposed side gears having outwardly axially projecting hubs adapted to splined engagement with respective axles, nonslip structure blocking relative rotation between an axle in the loaded condition and said casing, said structure comprising about each axle a coaxial outwardly tapered frusto-conical guide surface formed by the casing extending about said side gear hub to define therewith a frusto-conical annulus and within said annulus a congruent frusto-conical guide ring split along an axial plane to be constrictable between first and second diametrical proportions, each congruent with said guide surface in supporting relation by cooperating pin and slot elements parallel to the displacement direction of the guide ring and normally axially opposed to said side gear and circumferentially spaced from said side gear hub in said first diametrical proportion, said ring being responsive to side gear axial face engagement to slide outward in constricting relation along said guide surface taper to said second, reduced diametrical proportion thereby to mutually bind said side gear hub and said casing against their relative rotation.

* * * * *